June 17, 1930. C. W. ROUSE 1,763,904
APPARATUS FOR WASHING AND DRYING UTENSILS
Filed Sept. 19, 1927  2 Sheets-Sheet 1
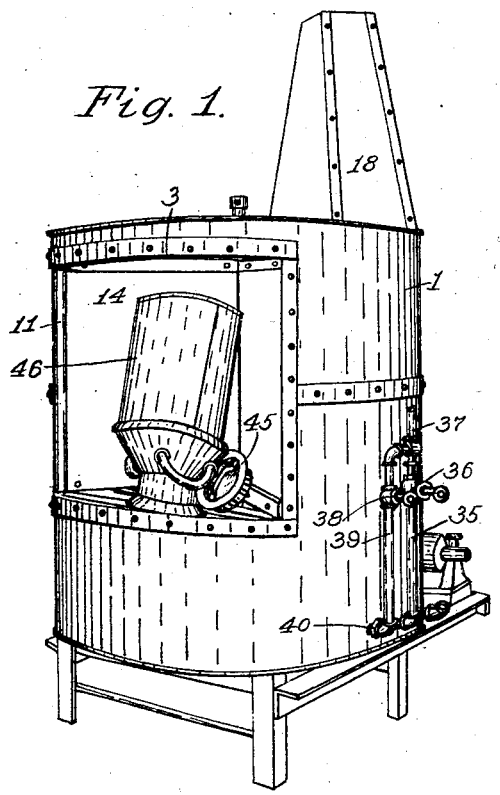
Fig. 1.
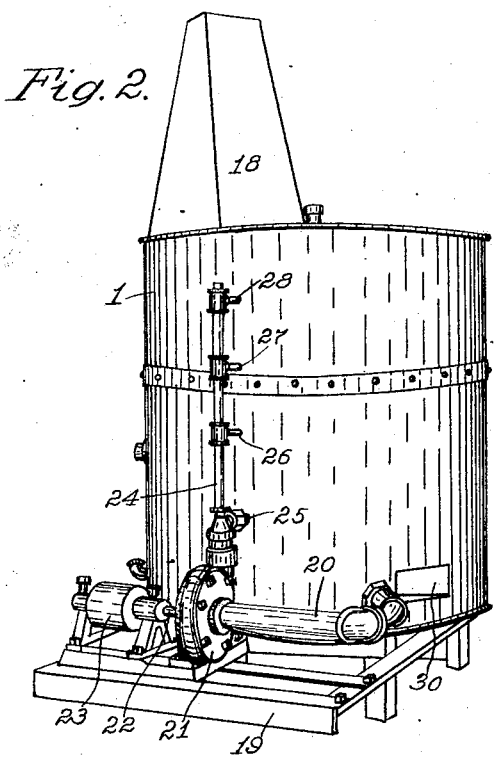
Fig. 2.
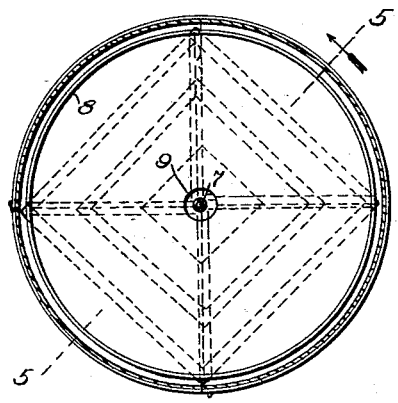
Fig. 3.
Fig. 4.
Inventor
C. W. Rouse,
By G. C. Kennedy
Attorney

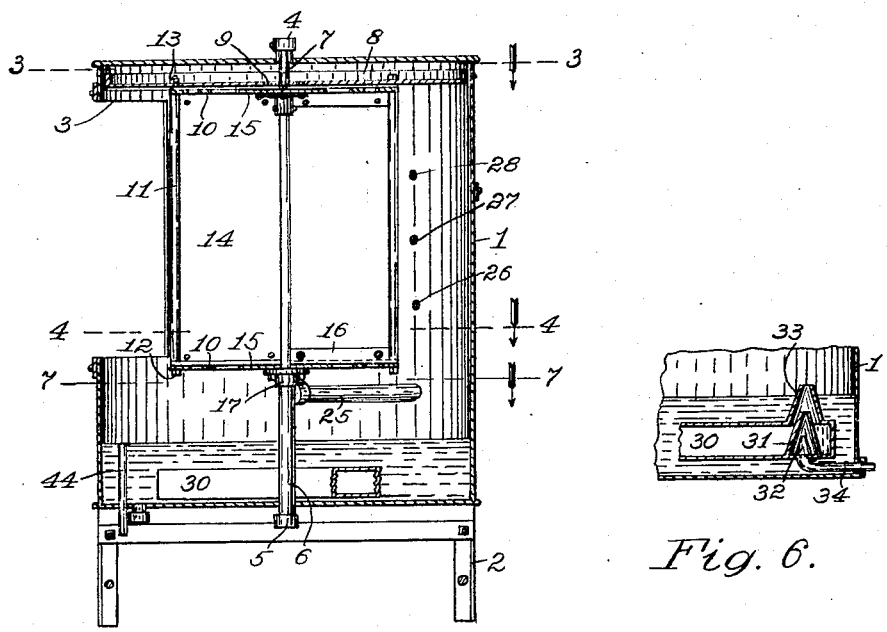
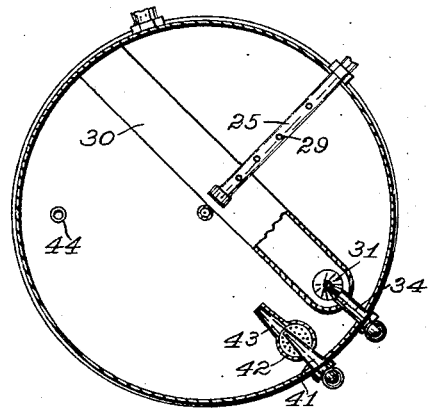

Patented June 17, 1930

1,763,904

UNITED STATES PATENT OFFICE

CHESTER W. ROUSE, OF HOPKINTON, IOWA

APPARATUS FOR WASHING AND DRYING UTENSILS

Application filed September 19, 1927. Serial No. 220,296.

My invention pertains to apparatus for washing and then drying utensils or other articles, and the object of my improvement specifically is to supply a device of this class suitable for washing milk cans and their covers, also having means for submitting these articles after washing to the surface action of steam under pressure for heating and driving off a surface film of the cleansing liquid for the rapid drying thereof before the removal of the articles.

I have accomplished the above object by the means which are hereinafter described and claimed, and which are illustrated by the accompanying drawings, in which Figs. 1 and 2 are respectively perspective elevations of opposite sides of my said apparatus. Fig. 3 is a horizontal section of the apparatus taken on the broken line 3—3 of Fig. 5. Fig. 4 is a horizontal section thereof taken on the broken line 4—4 of Fig. 5, and Fig. 7 is a horizontal section thereof taken on the broken line 7—7 of Fig. 5, all said sections being viewed in the direction indicated by the arrows. Fig. 5 is a vertical central section of the apparatus taken on the broken line 5—5 of said Fig. 3 and looking in the direction indicated by the arrow. Fig. 6 is a fragmentary vertical sectional view of a portion of the steam distributing device.

My invention is not restricted to the precise construction and arrangement of parts herein shown and described, nor to the various details thereof, as the same may be modified or rearranged in various particulars without departing from the spirit and scope of my invention, one practical embodiment of which has been herein illustrated and described without attempting to show all of the various forms and modifications in which my invention might be embodied.

Milk cans or other utensils or appliances which have been more or less coated by milk or greasy or otherwise closely adherent substances are somewhat difficult to cleanse and then dry rapidly and perfectly, which is absolutely essential in the conducting of a dairy or creamery or elsewhere. My apparatus is therefore designed mechanically suitably to receive and treat in succession articles to be cleansed and dried and then delivered progressively, without waste of the cleansing liquid from the device or useless expenditure of steam supply as a heating means for the said liquid or as a drying means for the utensils after treatment.

My improved apparatus includes a closed top and bottom hollow cylindrical casing 1 supported on a basal frame having legs 2 and with a laterally bracketed part 19. The casing has a large rectangular aperture 3 in its side wall spaced sufficiently above its lower end, and the casing has a pyramidally diminished open spout 18 at the top and opening through the top cover beyond the aperture 3 laterally to exhaust steam.

The numerals 4 and 5 respectively denote hollow bearing caps mounted centrally above each other in the top and bottom of said casing 1 to serve as bearing seats for the upper and lower ends of a central axial shaft 7 which may be manually rotated. In the upper part of said casing a utensil supporting device with partitioning members 14 radially fixed thereon is secured upon said shaft 7 to be in horizontal alinement with the side wall aperture 3 which opens thereinto. This rotary supporting means includes at top and bottom like radial angle bars 16 to which the imperforate partitioning plates 14 are fastened to subdivide the upper part of the casing between the arms 16 into a desired plurality of separated segmental chambers, in this case four. It will be noticed that when the said device is appropriately rotated one interspace or chamber between two of said partitions 14 will open into and register with said rectangular aperture 3 of the casing, as shown in Fig. 1.

At top and bottom of said rotatable device spaced cross-bars 10 are fastened upon said radial arms 16. The rectangular plates 15 have central holes to receive said shaft 7 which is secured centrally within the device upon said arms 16 and supported also upon annularly flanged sleeves 17 secured upon the shaft.

A circular shallow pan 8 is coaxially secured upon the upper part of said rotatable device, has a central vent opening 9, and is spaced a little above the upper rectangular plate 15 to deliver from the vent 9 downwardly upon the plate 15 and from the latter into the device and through the openings therein into the lower part of the casing which serves as a receptacle for a cleansing liquid, such as heated water. The pan 8 is provided to receive splashed water around the circumference of the pan coming from below during the washing process, and thus keep this water from being showered down into the drying chamber portion of the casing 1, the drip from the central opening 9 of the pan restricting such drip to the axial part of the carrier where the drying process will not be affected. To strengthen the rotary structure of the utensil supporting means I place tubular struts 11 between the vertically separated outer ends of the horizontal flanges of the radial arms 16, passing headed rods 12 through said struts and holes in said arms and secured by end nuts 13.

To properly support the lower flanged sleeve 17, another sleeve 6 is mounted around the lower part of the rotary shaft 7.

The bottom of the casing 1 has a discharge port with a removable plug to permit drawing off of fouled liquid, and has mounted near said port a vertically disposed overflow pipe 44 which automatically governs the level of the liquid in the casing.

Water or other cleansing liquid may be introduced into the lower receptacle part of the casing by way of the side aperture 3 and the interspaces of the utensil supporting lower cross-bars 10 and the central plate 15.

Referring to said Fig. 2, the numeral 20 denotes a conduit having at one end a communication with the lower part or receptacle for water of said casing and spaced slightly above the bottom thereof. This conduit leads into the receiving port of a rotary pump 21 mounted upon the bracketed platform 19 and having a driving shaft 22 which may be rotated by a belt-pulley 23 thereon by a driving belt not shown. The pump has a delivery or distributing pipe 24 having several vertically separated lateral delivery nipples 26, 27 and 28 which deliver liquid into the casing wall through seating holes therein horizontally in jets and into the interspaces or chambers of the rotary device in turn as the latter is rotated. The numeral 25 denotes a horizontal pipe section below said nipples and which traverses the casing to be positioned a little below the rotary supporting device, and has along its top a row of delivery holes 29 which deliver jets upwardly into said device by way of the interspaces of the lower cross-bars 10 and the central plate 15.

Referring to Figs. 1 and 7, I have shown therein means for heating the water in the lower part of the casing 1. Without the side wall of the casing, is supported the lower portion of a steam conduit 37, which may be in communication with a supply of steam under pressure such as will maintain its temperature at approximately 300 degrees, or in a state of what has been termed "dry steam." Said pipe 37 has governed communication by way of a valve-chamber 38 with a vertical pipe section 39 and the latter has end communication by way of an elbow coupling with a horizontal pipe section 40 which traverses the casing side wall to have a coned end nipple 41 disposed within the liquid in the lower part of the casing. Sealed around said coned nipple 41 is a hollow spherical chamber 42 which has numerous small holes thereover, and said chamber has a coned delivery nipple 43 which delivers into the surrounding liquid and is in alinement with the other nipple 41 to receive steam therefrom, the latter acting to propel therewith through the nipple 43 into the surrounding liquid water entering the chamber by way of the peripheral holes therein. This appliance quickly distributes heat throughout the liquid in the casing.

The said main pipe 37 also is in governed communication by way of another valve-chamber 36 with a vertical pipe section 35 whose lower end is coupled by an elbow to the outer end of a horizontal pipe section 34 (shown in Fig. 6) which traverses the casing wall and is positioned within the casing liquid. The numeral 30 denotes a relatively large air conduit whose outer end opens through the side wall of the casing to the atmosphere, and whose inner end is closed but admits the inner end part of said pipe section 34.

As shown in said Fig. 6 an air and steam mixer of a simple type is illustrated. This comprises a small erect conical nipple 32 with which the pipe section 34 is in communication by traversing the bottom of the air tube 30, the nipple 32 being positioned within said tube and within a concentric and spaced hollow conical nipple 31 whose lower end is sealingly fixed upon the bottom of the tube. The said outer nipple 31 projects upwardly centrally into and spaced from a concentric hollow nipple 33 whose lower end communicates and is closed around a concentric opening in the upper wall or top of the tube 30 around the upper part of the nipple 3. The upper part of the nipple 33 projects above the governed level of the liquid in said casing, and the nipple 33 is positioned to deliver mixed air and steam under pressure upwardly and into the rotatable structure thereabove to pass all about the different surfaces of utensils to be dried therein, the exhaust fluids then passing to the atmosphere upwardly by way of the hollow stack or delivery spout 18 thereabove after moving past the pan 8.

When, for example, as shown in said Fig. 1, a milk-can 46 has its cover 45 removed and is inverted and placed slopingly within the outwardly opening chamber of the rotary carrier through the aperture 3, the flaring neck of the can is then engaged between the pair of bottom cross-bars 10 which hold it in place, but so that jets of water or of steam in succession may be driven into its interior from the pipe 25—29 and the steam delivery nipple 33 below. These jets likewise pass over the outer periphery of the can upwardly, reinforced in the washing process by the horizontal jets of water impinging upon the can from the nipples 26 to 28 inclusive. The several jets as broken upon the can and the angularly directed partition walls 14 rebound upon the can, and upon its cover 45 placed upon the lower plate 15 to thoroughly wash it with the hot cleansing liquid which returns downwardly to the receptacle below, so that a constant circulation is had of the liquid through the apparatus. Any water which may be dashed upwardly toward the top of the casing around the circular open top pan 8 is returned by way of its central hole 9, and prevented from issuing by the aperture 3. It will be understood, that the said washing operation is had after the rotary device has been rotated to a position opposite the wall aperture 3. The succeeding drying operation is had when the rotary device has been manually rotated to be over the steam delivery nipple 33. The dry and superheated steam highly heats the utensils without wetting them, driving off the film of water thereon, drying them before the rotary support is finally rotated to expose the utensils to be removed by way of the aperture 3.

Having described my invention, what I claim as new, and desire to secure by Letters Patent, is:

1. In an apparatus of the character described, a closed hollow casing having a side wall aperture, a rotatable carrier mounted centrally within said casing having partitions thereon to sweep the inner wall of the casing, and common injector means in communication with the atmosphere and with superheated steam respectively for delivering between the carrier partitions in turn after a partial rotation of said carrier a mixture of superheated steam and air under pressure to treat the exposed parts of contents thereof to remove liquid film and dry said contents after lavation.

2. In an apparatus of the character described, a closed hollow casing having a side wall aperture, and a rotatable carrier mounted centrally within said casing having radial spaced imperforate partitions to terminally sweep close to the inner wall of the casing, said carrier having an open top centrally apertured hollow pan mounted thereon to peripherally receive splash fluid from below and redeliver it through the casing to the lower part thereof, and the interspaces of the partitions providing chambers for articles to be cleansed, the chambers opening successively in registration into said side wall aperture upon rotation of said carrier.

3. In an apparatus of the character described, a closed hollow casing having in its side wall an aperture, a rotatable carrier mounted in said casing and having partitions erected thereon, the lower part of the casing serving as a receptacle for a heated liquid, mechanism in communication with the liquid in the casing to deliver the liquid under pressure upon and to wash the surfaces of articles on the carrier during one stage of its rotation, an injector in said casing in communication with a superheated steam conduit and an air conduit, said air conduit being at the bottom of the casing and adapted to be submerged in the heated liquid and opening to the atmosphere, whereby a mixed current of dry steam and air in combination under pressure is caused to impinge upon said articles on said carrier during another stage of its rotation, for quick heating and drying purposes.

4. In an apparatus of the character described, a closed hollow casing having a vent for steam, and having in its side wall a portal aperture, a rotatable carrier in the upper part of said casing having an apertured bottom and having radial imperforate partitions extending to the inner wall of the casing, the lower part of the casing serving as a receptacle for heated liquid, means for heating the liquid in said casing, mechanism in communication with said liquid to deliver it for washing purposes upon articles on said carrier during one stage of its rotation, and an injector device in said casing having a communication with a supply of superheated steam under pressure and having also means of communication with the atmosphere through the heated liquid in the casing, said device being shaped to deliver mixed air and dry steam upon articles upon said carrier during another stage of its rotation for drying purposes, said mixed air and steam exhausting from the casing through said vent.

In testimony whereof I affix my signature.

CHESTER W. ROUSE.